(12) United States Patent
Yang

(10) Patent No.: US 6,776,325 B2
(45) Date of Patent: Aug. 17, 2004

(54) ELECTRONIC COMPONENTS CARRIER FOR COLLECTING ELECTRONIC COMPONENTS DROPPING FROM A CIRCUIT BOARD AND RELATED METHOD

(75) Inventor: Chun-Wei Yang, Tao-Yuan (TW)

(73) Assignee: High Tech Computer Corp., Tao-Yuan (TW)

( * ) Notice: Subject to any disclaimer, the term of this patent is extended or adjusted under 35 U.S.C. 154(b) by 0 days.

(21) Appl. No.: 10/249,457

(22) Filed: Apr. 11, 2003

(65) Prior Publication Data

US 2004/0079785 A1 Apr. 29, 2004

(30) Foreign Application Priority Data

Oct. 24, 2002 (TW) ........................................ 91124839 A (51) Int. Cl.[7] .............................................. B23K 1/018
(52) U.S. Cl. ........................................ 228/13; 228/49.5
(58) Field of Search ................................. 228/191, 212, 228/213, 264, 4.1, 5.5, 6.1, 6.2, 44.3, 44.7, 49.1, 49.5, 13, 14, 19; 269/157–163, 254 R (56) References Cited

U.S. PATENT DOCUMENTS

| | | | | |
|---|---|---|---|---|
| 4,831,724 A | * | 5/1989 | Elliott | 29/840 |
| 4,868,974 A | * | 9/1989 | Nishiguchi | 29/740 |
| 5,332,463 A | * | 7/1994 | Eberlein et al. | 156/556 |
| 5,895,554 A | * | 4/1999 | Gordon | 156/556 |
| 6,323,437 B1 | * | 11/2001 | Johnson | 174/260 |
| 6,328,196 B1 | * | 12/2001 | Imanishi et al. | 228/9 |

* cited by examiner

Primary Examiner—Kiley Stoner
Assistant Examiner—Jonathan Johnson
(74) Attorney, Agent, or Firm—Winston Hsu (57) ABSTRACT

An electronic component carrier includes a frame, a circuit board clamp fixed to the frame for clamping a circuit board, a vibrating device for vibrating the circuit board while the circuit board is carried through a reflow oven and the temperature inside the reflow oven is a predetermined temperature, and a collector installed on the frame for collecting electronic components dropping from the circuit board.

19 Claims, 6 Drawing Sheets

ELECTRONIC COMPONENTS CARRIER FOR COLLECTING ELECTRONIC COMPONENTS DROPPING FROM A CIRCUIT BOARD AND RELATED METHOD

BACKGROUND OF INVENTION

1. Field of the Invention

The present invention relates to an electronic components carrier. More specifically, an electronic components carrier is disclosed that collects electronic components dropping from a circuit board.

2. Description of the Prior Art

With the rapid development of electronics, the design of electronic products frequently changes. Electronic components mounted on a circuit board within the products become obsolete and are often simply thrown away due to the high manpower costs of recycling them, except for expensive components such as memories and processors. In addition to environmental problems that this leads to, a great deal of resources are wasted.

There are two methods from removing electronic components from a circuit board according to prior art. One is to the use of a soldering device that is specifically designed to heat small outlined integrated circuits (SOIC) of various sizes having less than 64 pins. When solder on the component melts, the component is removed from the circuit board. The other method involves using a heated air injector with a particularly designed air grilleto heat SOICs of various sizes, and to heat SOICs in ball grid array packages (BGA packages). When solder on the component has melted, the component is taken from the circuit board.

But these methods from removing electronic components from a circuit board according to prior art have several disadvantages. Take, for example, the heated air injector:

a) A high cost is associated with the equipment used for detachment. Due to the various sizes possible with SOICs, a heated air injector requires many corresponding mouths for removing such components.

b) A slow operational speed in detachment. Takinga 17 mm SOIC as an example, a practiced operator needs 30 seconds on average to remove the SOIC from the circuit board. This 30 seconds is simply for the single SOIC, and does not include the additional time required to remove other electronic components.

c) Difficulty in temperature control. A primary factor of when removing components with a heated air injector is whether or not the heated air flow from the mouth of the injector is steady in temperature and flow. The temperature of a heated air flow from typical heat air injectors is between 250° C.–600° C. Over-heated or under-heated air flows can lead to failure to remove a SOIC from a circuit board, and furthermore does harm to the SOIC.

d) Failing when removing certain types of electronic components. Because some components are made from plastic, such as connectors and switches, they are easily affected by heated air flows, and can become so fragile that that they are unable to withstand irregular external forces. When taken from the circuit board, the failure rate of such components is quite high.

e) When electronic components, such as SOICs, are removed from a circuit board, because of carelessness or lack of skill of the operator, the SOICs are frequently unusable due to distorted or bent pins, despite the fact that so much time and energy have been spent attempting to carefully remove the SOIC.

SUMMARY OF INVENTION

It is therefore a primary objective of the claimed invention to solve the above-mentioned problems by introducing an electronic components carrier for easily removing electronic components from a circuit board.

The claimed invention is an electronic components carrier installed in a reflow oven. The electronic components carrier includes a frame, a circuit board clamp fixed on the frame for clamping a circuit board, a vibrating device for vibrating the circuit board while the circuit board is carried through a reflow oven and the temperature inside the flow oven has reached a predetermined temperature, and a collector installed on the frame for collecting electronic components dropping from the circuit board. The collector has a plurality of meshes, and the size of each mesh is smaller than that of any electronic component on the circuit board.

The vibrating device includes a support installed on the frame for supporting an end of the circuit board, which is clamped by the clamp, at a predetermined height. The vibrating device includes a groove for accepting the support, and a hook for fixing the support against the groove. The reflow oven, into which the electronic components carrier goes, contains a trigger, which includes a trigger set and a trigger finger, to trigger the support of the vibrating device. One end of the trigger finger is fixed on the trigger set and the other end triggers the support so that the circuit board supported by the support drops on the frame when the temperature inside the reflow oven is higher than the predetermined temperature.

These and other objectives of the claimed invention will no doubt become obvious to those of ordinary skill in the art after reading the following detailed description of the invention, which is illustrated in the various figures and drawings.

DETAILED DESCRIPTION

Figure 1:
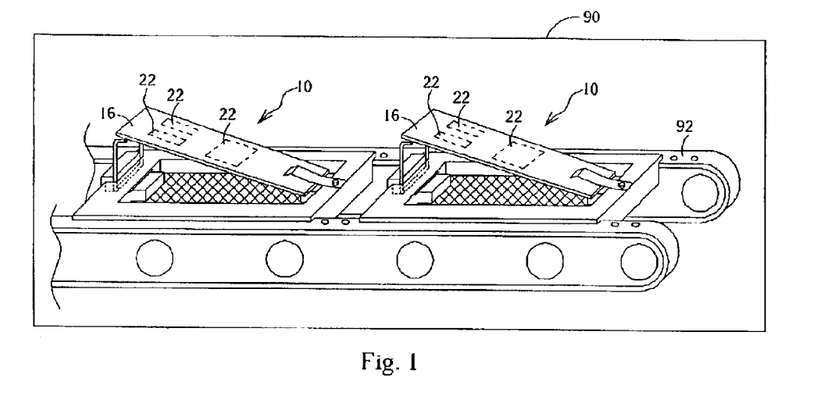
FIG. 1 is a schematic diagram of an electronic components carrier of the preferred embodiment according to the present invention used in a reflow oven.

The electronic components carrier of the present invention is used in a reflow oven. Please refer to the FIG. 1, which is a schematic diagram of an electronic components carrier 10 of the preferred embodiment according to the present invention being used in a reflow oven 90. In the electronic components carrier 10 there is placed a circuit board 16, on which plurality of electronic components 22, shown as dotted lines, are disposed by surface mounting technology (SMT). The reflow oven 90 has a trigger device 38, shown in FIG. 3, and a conveyor 92, which delivers the electronic components carrier 10. Please refer to FIG. 2, which is a chart of temperature over time in the reflow oven 90. The X-axis represents time, and the Y-axis represents temperature. The reflow oven 90 is turned on at a time t0, and the temperature inside the reflow oven 90 begins to rise. At time t1 the temperature inside the reflow oven 90 stops rising and remains between 220° C.–240° C. for a predetermined length of time. Within this temperature range, the solder that electrically connects the electronic components 22 to the circuit board 16 starts to melt. At time t2 the temperature inside the reflow oven 90 decreases to ensure that the solder on the circuit board 16 is completely melted without damaging the circuit board 16.

Figure 3:
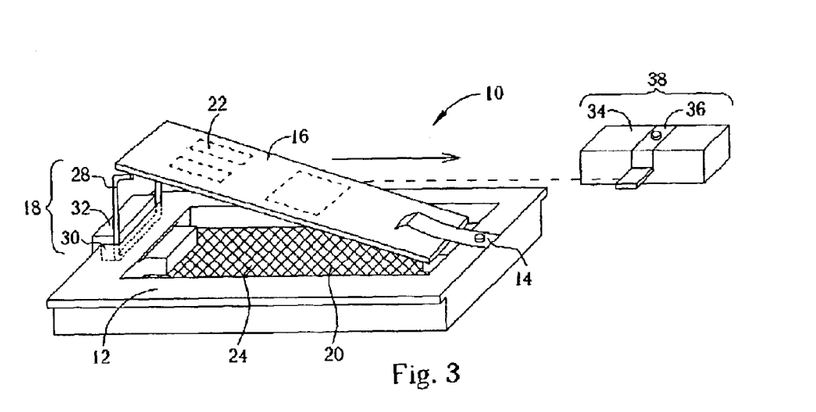
FIG. 3 is a schematic diagram of the electronic components carrier of FIG. 1 clamping a circuit board and a trigger in the reflow oven.

Please refer to FIG. 3, which is a schematic diagram of the electronic components carrier 10 and the trigger device 38 in the reflow oven 90. The trigger device 38 includes a trigger housing 34 and a trigger finger 36, which are described later. The electronic components carrier 10 has a frame 12, a clamp 14 fixed on the frame 12 for clamping an end of the circuit board 16 in the electronic components carrier 10 on the frame 12, and a vibrating device 18 for vibrating the circuit board 16 to cause the electronic components 22 to drop off when the circuit board 16 is carried through the reflow oven 90 and the temperature inside the flow oven 90 has reached a predetermined temperature. The electronic components carrier 10 also has a collector 20 installed on the frame 12 for collecting the electronic components 22 that drop off of the circuit board 16. The collector 20 has plurality of meshes 24, and the size of each mesh 24 is smaller than that of any electronic component 22 on the circuit board 16. That is, the size of the mesh 24 has to be large enough to allow the heated air flowing from the reflow oven 90 to pass through, and yet small enough to prevent electronic components 22 dropping off of the circuit board 16 from passing through the mesh 24. Furthermore, the depth of the collector 20 must be sufficient to prevent the electronic components 22 dropped off from bouncing back and contacting the circuit board 16. The clamp 14 can be a flexible piece of metal.

The vibrator 18 of the electronic components carrier 10 contains a support 28 fixed on the frame 12 for supporting one end of the circuit board 16, of which the other end is clamped by the clamp 14. The support 28 is designed to lift one end of the circuit board 16 to a predetermined height. The predetermined height should be sufficient to cause the end supported by the support 28 to vibrate against the frame 12 by the rebound of the flexible clamp 14 when the end is no longer supported. The vibration causes the electronic components 22 on the circuit board 16 to drop off into the collector 20 when the soldier tin on the circuit board 16 is melted. The vibrator 18 also includes a support groove 30 for placement of the support 28, and a fastener 32 for hooking up the support 28 in the support groove 30.

Figure 2:
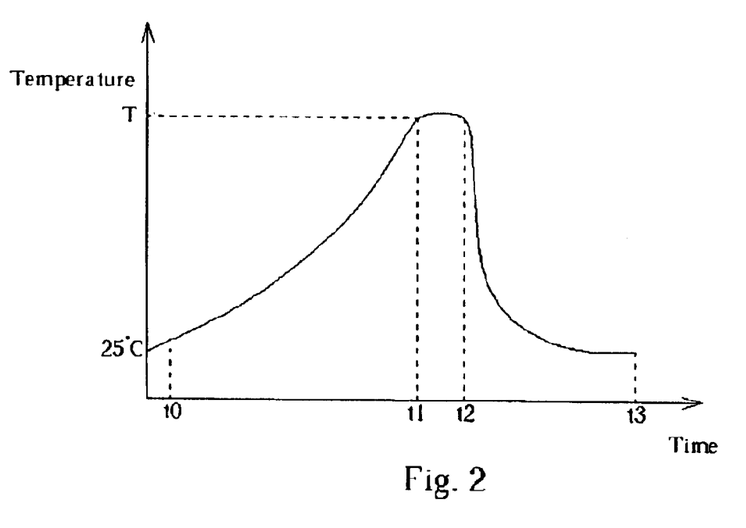
FIG. 2 is a chart of temperature over time in the reflow oven of FIG. 1.

One end of a trigger finger 36 of a trigger device 38 within the reflow oven 90 is fixed on a trigger housing 34, and the other end is used to trigger the support 28 so as to make the supported edge of the circuit board 16 fall from the support 28 onto the frame 12 when an elapsed time within the reflow over 90 has exceeded a predetermined time limit. The predetermined time limit is one that ensures that the temperature inside the reflow oven 90 is higher than the predetermined temperature. Referring to FIG. 2, when the time is at or near t2, the temperature inside the reflow oven 90 causes the soldier tin on the circuit board 16 to be completely melted, and then at this time the trigger finger 36 triggers the support 28 so that the supported edge of the circuit board 16 falls onto the frame 12 on account of the rebound of the clamp 14. At this time, the electronic components 22 on the circuit board 16 drop into the collector 20 of the electronic components carrier 10.

The following is a process for detaching the electronic components 22 from the circuit board 16 utilizing the preferred embodiment according to the present invention. Please refer to FIG. 2 for this explanation. Initially, one end of the circuit board 16 is clamped, with the circuit board 16 oriented so that the electronic components 22 face downwards. The support 28 of the vibrator 18 is then utilized to support the other end of the circuit board 16, lifting the end to the predetermined height. The electronic components carrier 10 with the circuit board 16 is placed on the conveyor 92 of the reflow oven 90, and the reflow oven 90 is turned on. After preheating, any moisture on the electronic components 22 gradually evaporates, and the temperature inside the reflow oven 90 reaches and maintains the temperature T at the time t1, at which point the solder begins to melt. Through a predetermined period of about 5 to 10 seconds, the solder on the circuit board 16 becomes completely melted. Simultaneously, the conveyor 92 has delivered the electronic components carrier 10 to the location at which the trigger finger 36 of the trigger device 38 is just able to trigger the support 28. With the constant movement of the conveyor 92, the trigger finger 36 triggers the support 28 so that the supported end of the circuit board 16 strikes and vibrates against the frame 12. As mentioned, the vibration is strong enough to cause all of the electronic components 22 on the circuit board 16 to drop off onto the collector 20. Because of the depth of the collector 20, the electronic components 22 do not rebound and contact the circuit board 16. Finally, when the temperature inside the reflow oven 90 decreases at the time t2, the operator can remove the electronic components carrier 10, which contains a now empty circuit board 16 and the electronic components 22, and places the electronic components 22 contained within the electronic components carrier 10, and which are appropriately de-tined, into a proper container for reuse.

All components in the electronic components carrier 10, such as the frame 12, the support 28 and the trigger finger 36, are made of high-temperature resistant materials. The vibrator 18 shown in the first embodiment is one of many kinds of vibrating devices. Of note is that the vibrating device of any electronic components carrier 10 has to trigger the circuit board 16 when the solder on the circuit board 16 is has completely melted, and the trigger should be strong enough to cause the electronic components 22 to drop off from the circuit board 16.

Figure 4:
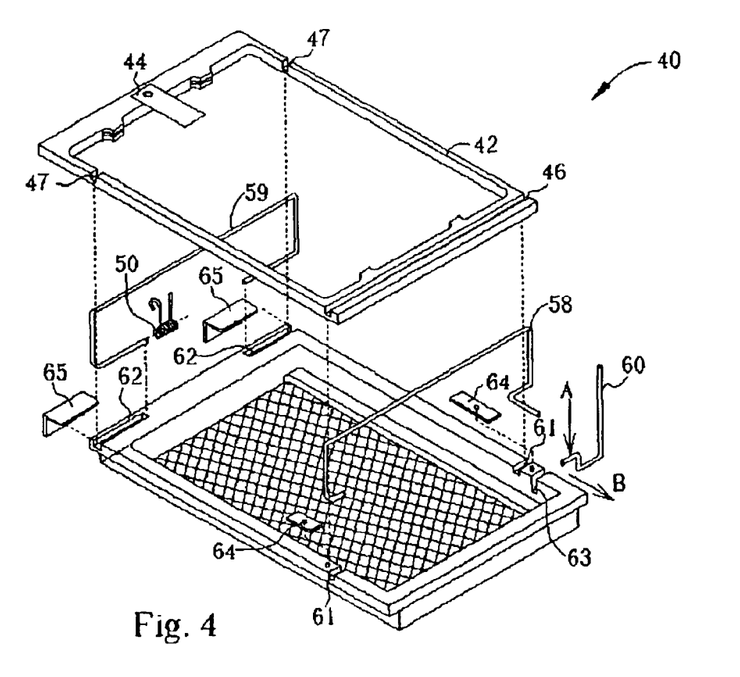
FIG. 4 is a schematic diagram of an electronic components carrier of a second embodiment according to the present invention clamping a circuit board.

Please refer to FIG. 4, which is a schematic diagram of an electronic components carrier 40 of a second embodiment according to the present invention. The structure of the electronic components carrier 40 is similar to that of the electronic components carrier 10. The primary difference is that the electronic components carrier 40 does not include the clamp 14, the support 28, and the support groove 30, or the fastener 32, but instead has a circuit board frame 42 and a circuit board fixing device 44. In this second embodiment, the circuit board 16 is fixed on the circuit board frame 42 by the circuit board fixing device 44. There are a first groove 46, and two second grooves 47, on the circuit board frame 42. As shown in FIG. 4, the first groove 46 is at one end of the circuit board frame 42, and the second grooves 47 are at a predetermined distance from the other end of the circuit board frame 42. The purpose of the grooves is explained later. Note that a vibrator of the electronic components 40 is not the same as the vibrator 18 that has a single support 28. The vibrator has a first support 58, a second support 59, and a third support 60. Support grooves 61 and 63, and fasteners 64 and 65, correspond to each of the supports, except that the third support 60 has no corresponding fastener. The first support 58 and the second support 59 are on the frame 12, corresponding to the first groove 46 and the second groove 47 respectively, and together support the circuit board frame 42. An end of the third support 60 is disposed in the third groove 63, and the other end of the support 60 receives the trigger from the trigger device 38. The height of the first support 58 and that of the second support 59 approximate the predetermined distance so as to assure that the electronic components 22 on the circuit board 16 do not fall out of the circuit board frame 42. The vibrator also includes an elastic object 50, such as a spring, which is in the support groove 62, and which connects to the second support 59, for causing the circuit board frame 42 to rebound against the frame 12 when the third support 60 is triggered by the trigger device 38. This enables the electronic components 22 on the circuit board 16 to drop off through the circuit board frame 42.

The process of detaching the electronic components 22 from the circuit board 16 by the electronic components carrier 40 is nearly the same as that of the preferred embodiment. Initially, the circuit board fixing device 44 on the circuit board frame 42 is used to fix the circuit board 16 onto the circuit board frame 42. Then, the first support 58 in the first groove 46, and the second support 59 in the second groove 47, are emplaced, and the third support 60 is used to support the circuit board frame 42 at the predetermined height. One end of the third support 60, designated by arrow A, props up the second support 59 so as to prevent the circuit board frame 42 from falling onto the frame 12 on account of biasingby the spring 50. The electronic components carrier 40 containing the circuit board 16 is then sent into the reflow oven 90.When the temperature inside the reflow oven 90 reaches the predetermined temperature, the conveyor 92 in the reflow oven 90 also delivers the electronic components carrier 40 to the location where the trigger finger 36 of the trigger device 38 is able to trigger the third support 60. When the third support 60 is triggered by the trigger finger 36, the end propping up the second support 59 moves in the direction of arrow B until it upon longer supports the second support 59. Without the support of the second support 59, due to the biasing of the spring 50, the circuit board frame 42 falls onto the frame 12. At the same time, the electronic components 22 on the circuit board 16, which is fixed onto the circuit board frame 42 by the circuit board fixing device 44, drop offinto the collector 20.

Of the previous two embodiments, the electronic components carriers 10 and 40 cause the electronic components 22 on the circuit board 16 to drop off onto the collector 20 by way of the common trigger finger 36 of the trigger device 38 in the reflow oven 90 triggering the support 28 or the third support 59. Please refer to FIG. 5, which is a schematic diagram of an electronic components carrier 70 of a third embodiment of the present invention. The electronic components carrier 70 does not need the trigger device 38 in the reflow oven 90. The electronic components carrier 70 includes a frame 72, a clamp 74 fixed on the frame 72 for clamping one end of the circuit board 16 in the electronic components carrier 70 onto the frame 72, a temperature sensor 76 on the frame 72 for sensing the temperature around the circuit board 16, and a collector 80 on the frame 72 for collecting the electronic components 22 dropping off of the circuit board 16 due to the vibration of a vibrating device 78. One end of the vibrating device 78 is fixed on the frame 72, and the other end vibrates the frame 72 or the circuit board 16 by swinging along the path indicated by the arrow. The collector 80 has a plurality of meshes 84. The size of each mesh is smaller than that of each of the electronic components 22. Additionally, the depth of the collector 80 should be so sufficient so that when the electronic components 22 drop off from the circuit board 16 on account of the vibration by the vibrating device 78, the electronic components 22 do not rebound from the bottom of the collector 80 and contact the circuit board 16. The clamp 74 can be a flexible strip or sheet of metal.

The process of detaching the electronic components 22 from the circuit board 16 by way of the electronic components carrier 70 is nearly the same as that of the previous embodiments. The difference is that the electronic components carrier 70 does not require interaction with the reflow oven 90. Please refer to FIG. 6, which is a flow chart of the process of detaching the electronic components 22 from the circuit board 16 by the electronic components carrier 70. The following details the steps.

Figure 6:
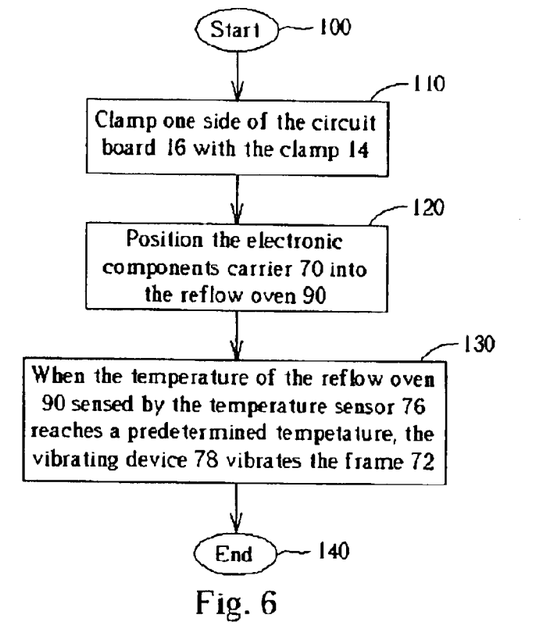
FIG. 6 is a flow chart of removing electronic components from a circuit board by way of the third embodiment according to the present invention.

Step 100:Start.

Step 110:Clamp one end of the circuit board 16, with the electronic components 22 facing downwards, in the clamp 74 of the electronic components carrier 70.

Step 120:Place the electronic components carrier 70 containing the circuit board 16 into the reflow oven 90.

Step 130:When the temperature sensor 76 senses the temperature inside the reflow oven 90 has reached the predetermined temperature, the vibrating device 78 of the-electronic components carrier 70 starts to vibrate the frame 72 or the circuit board 16.When the temperature inside the reflow oven 90 reaches the predetermined temperature, the solder on he circuit board 16 is melted. Therefore, if the vibrating device 78 simultaneously vibrates the frame 72, it also vibrates the circuit board 16. The electronic components 22 on the circuit board 16 thus drop off into the collector 80.

Step 140:End. The electronic components carrier 70 is removed from the reflow oven 90, and with appropriate de-tinning processes, the electronic components 22 are placed in a proper container for future use.

Figure 5:
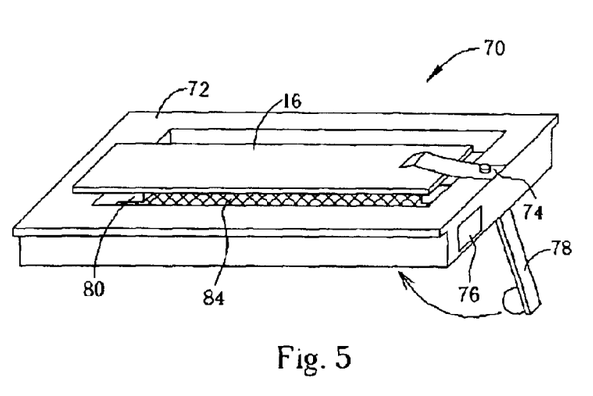
FIG. 5 is a schematic diagram of an electronic components carrier of a third embodiment according to the present invention.

With the electronic components carrier 70, the temperature sensor 76 can sense the temperature in an electronic manner, in a mechanical manner, or in any other way to control the operation of the vibrating device 78. Taking a mechanical fashion as an example, the temperature sensor 78 may utilize thermal expansion to control the motion of the vibrating device 78. Moreover, the vibrating device 78 in FIG. 5 illustrates the simplest embodiment. A vibrating device that applies a vibration upon any object to cause the electronic components to loosen and fall in accordance with a temperature change is within the scope of the present invention.

In comparison to prior art, the electronic components carrier 10, as well as the electronic components carriers 40 and 70, at least have the following advantages:

a)Low associated production costs. All components of the electronic components carrier 10 are composed of simple metal molds, and so they have a long life span and simple maintenance requirements.

b)High efficiency of operation. Many electronic components carriers 10 can be placed upon the conveyor 92, and all the electronic components 22 on the circuit boards in the electronic components carriers 10 drop off at a time when the vibrating device 78 vibrates the circuit board 16.

c)High production yield.Control over time and temperature inside the reflow oven 90 is much easier to maintain than control over the temperature and strength of an air flow heated from a heated air injector. Therefore, the electronic components 22 on the circuit board 16 will neither fail to be removed due to insufficient temperature inside the reflow oven 90, nor will they be destroyed because of excessive temperatures inside the reflow oven 90.

d)Transformation of non-detachable electronic components such as connectors and switches into detachable ones.With respectto each electronic component 22 on the circuit board 16, inertia generated by the impactof the circuit board 16 is consistent, and so the failure rate of plastic electronic components 22 removed from the circuit board 16 is quite low.

e) Simple operation. An operator using the electronic components carrier 10 only needs to learn how to put the electronic components carrier 10 onto the conveyor 10, turn on the reflow oven 90, remove the electronic components carrier 10 on the conveyor 92 after a predeterminedtime, and de-tin the electronic components 22. The electronic components are then available for reuse.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An electronic component carrier comprising:

a frame;

a clamp fixed on the frame for clamping a circuit board to the frame;

a vibrating device for vibrating electronic components on the circuit board inside a reflow oven while a temperature inside the reflow oven is a predetermined temperature; and a collector installed on the frame for collecting electronic components dropping from the circuit board.

2. The electronic component carrier of claim 1 wherein the collector has a plurality of apertures, and each aperture is smaller than any electronic component on the circuit board.

3. The electronic component carrier of claim 1 wherein the clamp is an elastic metal sheet.

4. The electronic component carrier of claim 3 wherein the vibrating device comprises a support installed on the frame for supporting one side of the circuit board clamped by the clamp at a predetermined height, a support groove for accommodating the support, and a fastener for fastening the support to the support groove.

5. The electronic component carrier of claim 1 wherein the reflow oven comprises a trigger device for triggering the support when the predetermined temperature is reached so that the supported circuit board drops down onto the frame.

6. The electronic component carrier of claim 5 wherein the trigger device comprises a trigger housing and a trigger finger, one end of the trigger finger being fixed on the trigger housing, and another end of the trigger finger for triggering the support at the predetermined temperature so that the supported circuit board drops down onto the frame.

7. The electronic component carrier of claim 1 wherein the electronic components are attached to the circuit board in a surface mounting technology (SMT) manner.

8. The electronic component carrier of claim 1 wherein the reflow oven comprises a transportation device for transporting the frame within the reflow oven.

9. An electronic component carrier used in a reflow oven having a trigger device, the electronic component carrier comprising:

a frame;

a clamp fixed on the frame for clamping a circuit board to the frame;

a vibrating device for vibrating electronic components on the circuit board inside the reflow oven while a temperature inside the reflow oven is a predetermined temperature; and a collector installed on the frame for collecting electronic components dropping from the circuit board.

10. An electronic component carrier comprising:

a frame;

a circuit board frame;

a clamp fixed on the frame for clamping a circuit board;

a vibrating device for vibrating electronic components on the circuit board inside a reflow oven while a temperature inside the reflow oven is a predetermined temperature; and a collector installed on the frame for collecting electronic components dropping from the circuit board.

11. The electronic component carrier of claim 10 wherein the collector has a plurality of apertures, and each aperture is smaller than any electronic component on the circuit board.

12. The electronic component carrier of claim 10 wherein the clamp is an elastic metal sheet.

13. The electronic component carrier of claim 12 wherein the vibrating device comprises an elastic object, a first support, a second support, and a third support, all installed on the frame; both the first support and the second support for supporting the circuit board frame at a predetermined height, one end of the third support for supporting the second support while the second support is supporting the circuit board frame at the predetermined height so that the second support is capable of maintaining support to the circuit board frame while the elasticity of the elastic element is applied.

14. The electronic component carrier of claim 13 wherein the reflow oven comprises a trigger device for triggering the third support while at the predetermined temperature so that the circuit board frame drops down onto the frame due to rebound of the elastic object when the third support no longer props up the second support.

15. The electronic component carrier of claim 14 wherein the trigger device comprises a trigger housing and a trigger finger, one end of the trigger finger being fixed on the trigger housing, and another end of the trigger finger for triggering the third support at the predetermined temperature so that the circuit board frame drops down onto the frame due to the rebound of the elastic object when the third support no longer props up the second support.

16. The electronic component carrier of claim 10 wherein the electronic components are attached to the circuit board in a surface mounting technology (SMT) manner.

17. The electronic component carrier of claim 10 wherein the reflow oven comprises a transportation device for transporting the frame to inside the reflow oven.

18. An electronic component carrier comprising:

a frame;

a clamp fixed on the frame for clamping a circuit board to the frame;

a temperature sensor for sensing a surrounding temperature;

a vibrating device for vibrating electronic components on the circuit board inside a reflow oven while a temperature inside the reflow oven is a predetermined temperature; and a collector installed on the frame for collecting electronic components dropping from the circuit board.

19. The electronic component carrier of claim 18 wherein the collector has a plurality of apertures, and each aperture is smaller than any electronic component on the circuit board.

* * * * *